(12) United States Patent
Gale et al.

(10) Patent No.: US 12,417,273 B2
(45) Date of Patent: Sep. 16, 2025

(54) MANAGEMENT SYSTEM AND METHOD FOR USER AUTHENTICATION ON PASSWORD BASED SYSTEMS

(71) Applicant: BTBLOCK LLC, Denver, CO (US)

(72) Inventors: Brian Gale, Denver, CO (US); Thomas Olofsson, Stockholm (CH)

(73) Assignee: BTBlock, LLC, Denver, CO (US)

( * ) Notice: Subject to any disclaimer, the term of this patent is extended or adjusted under 35 U.S.C. 154(b) by 120 days.

(21) Appl. No.: 17/914,298

(22) PCT Filed: Mar. 23, 2020

(86) PCT No.: PCT/US2020/024219
§ 371 (c)(1),
(2) Date: Sep. 23, 2022

(87) PCT Pub. No.: WO2021/194464
PCT Pub. Date: Sep. 30, 2021

(65) Prior Publication Data
US 2023/0104633 A1    Apr. 6, 2023

(51) Int. Cl.
*G06F 21/33*    (2013.01)
(52) U.S. Cl.
CPC .................... *G06F 21/33* (2013.01)
(58) Field of Classification Search
CPC ........ G06F 21/33; G06F 21/335; G06F 21/41; G06F 21/45; G06F 21/46; H04L 9/0861; H04L 9/3213; H04L 63/083
See application file for complete search history.

(56) References Cited

U.S. PATENT DOCUMENTS

| 8,140,855 B2 | 3/2012 | Zhu et al. |
| 2005/0195975 A1* | 9/2005 | Kawakita ............ H04L 9/3236 |
| | | 380/30 |

(Continued)

FOREIGN PATENT DOCUMENTS

| CN | 106534085 A | * | 3/2017 | ......... G06F 21/6245 |
| CN | 114692130 A | * | 7/2022 | ......... G06F 12/1408 |

(Continued)

OTHER PUBLICATIONS

Vinck Bart, European Patent Office; Nov. 23, 2023; Extended European Search report European patent application No. 20927436.4 pp. 1-10.

(Continued)

*Primary Examiner* — Sarah Su
(74) *Attorney, Agent, or Firm* — Bradley Arant Boult Cummings, LLP; Jacob W Neu; Alex Huffstutter

(57) ABSTRACT

Systems and methods are disclosed herein to generate unique high entropy deterministic authentication tokens or passwords derived from user account information and a high entropy random number secured on a user device. Systems and methods can further include a counting variable such as a nonce to generate more than one unique high entropy deterministic authentication token for a single account, for instance, to facilitate updating the authentication token for that account to a new unique authentication token. From the user perspective, systems and methods can be used to provide an authentication token manager and/or password manager, where the user is able to access user accounts via a single user-provided authentication such as a master password or biometric data. Because the tokens/passwords are generated deterministically, they need not be stored by the token/password manager.

24 Claims, 8 Drawing Sheets

190 —

Receive as inputs to a one-way deterministic computational process, a random number and user account information — 192

Generate an output of the one-way deterministic computational process, the output based at least in part on the inputs — 194

Generate, based at least in part on the output to the one-way deterministic computational process, a user password associated with the user account information. — 196

(56) References Cited

U.S. PATENT DOCUMENTS

| | | | |
|---|---|---|---|
| 2006/0107040 A1* | 5/2006 | Fiske | H04L 9/0897 |
| | | | 713/157 |
| 2009/0260077 A1 | 10/2009 | Zhu et al. | |
| 2010/0199089 A1* | 8/2010 | Vysogorets | G06F 21/34 |
| | | | 713/168 |
| 2015/0113283 A1 | 4/2015 | Corella et al. | |
| 2018/0295123 A1* | 10/2018 | Camenisch | H04L 9/30 |
| 2021/0234697 A1* | 7/2021 | Sarda | H04L 63/0442 |
| 2024/0259194 A1* | 8/2024 | Matthews, Jr. | H04L 9/0822 |

FOREIGN PATENT DOCUMENTS

| | | | | |
|---|---|---|---|---|
| EP | 2953312 | | 12/2015 | |
| EP | 2953312 A1 * | | 12/2015 | G06F 21/41 |
| EP | 3813293 B1 * | | 8/2023 | H04L 63/0428 |
| KR | 20080087529 A * | | 10/2008 | |
| WO | WO-9325948 A1 * | | 12/1993 | G01R 31/318385 |
| WO | 2011/050332 A1 | | 4/2011 | |
| WO | WO-2018234886 A1 * | | 12/2018 | G06F 21/31 |
| WO | WO-2020118583 A1 * | | 6/2020 | G06F 12/0802 |

OTHER PUBLICATIONS

A. Menezes, et al. "Handbook of Applied Cryptography Chapter 10 Identification and Entity Authentication" 1997 (CRC Press) pp. 1-41.

Bart Vicnk, Communication Pursuant to Article 94(3), EPO, EP 20927436.4 (Jul. 28, 2025).

* cited by examiner

MANAGEMENT SYSTEM AND METHOD FOR USER AUTHENTICATION ON PASSWORD BASED SYSTEMS

BACKGROUND

The present invention generally relates to systems and methods for authenticating users, agents, and or other computer systems.

Currently, many web-based and network-based computer systems rely on user provided authentication. In web-based computer systems, users navigate to a login page including fields where the user can enter a username and a password. Similarly, network-based computer systems can request a username and password through an application providing a prompt. User generated passwords can be vulnerable to hackers due to low entropy of the password, reuse of the password, and reverse engineered hash functions used to obscure weakly secured stored passwords.

Password entropy is a quantification (usually expressed in bits) of how computationally difficult a given password can be derived through guessing, brute force cracking, dictionary attacks, or other common methods. A password that is already known has zero bits of entropy; a password that can (with about 50% probability) be derived on the first try has 1 bit of entropy; and a password that has n bits of entropy is expected to be guessed within $2^n$ tries or less. Computational complexity required to obtain the password therefore increases exponentially with increased entropy expressed in bits; therefore, a small increase or decrease in entropy can have a significant effect on the securing of the password. Considering known methods for password cracking which exploit user habits for creating memorable passwords, a majority of user-generated passwords contain less than 16 bits of entropy. The National Institute of Science and other sources have recommended passwords should contain about 30 bits of entropy (or more) for sufficient protection in most use scenarios. For further comparison, a computer-generated encryption key contains at least 128 bits of entropy. Because increased entropy requires a user to deviate from habits used to create memorable passwords, it can be difficult for users to increase entropy of memorized passwords.

Since users have a hard time memorizing a large number of passwords, many users resort to using similar or identical passwords across multiple accounts. Therefore, when user's credentials (including password) are obtained for one account, other accounts can be easily compromised by using the same credentials or guessing similar credentials on other password based systems.

Typically, systems relying on a password for user authentication store user passwords in hashed form ("password hash"). Hashing performs a one-way transformation on a password, meaning the password is computationally difficult to recover even if the password hash is known. Many of such password based systems rely on this computational difficulty to protect user passwords and do not encrypt the hashed form of the passwords when stored at rest. With access to a hashed password, an attacker can guess offline in an attempt to determine a password which hashes to the password hash, where passwords with a higher entropy require more guesses and therefore longer computation time. Poor (or non-existent) hashing algorithms and/or access to multiple hashes of the same password (due to user reuse) can decrease the computational difficulty of deriving a password from one or more hashes, thereby increasing the likelihood that password credentials can be leaked.

Attempts to address the above issues are carried out on two fronts: the user authentication system ("target system") side, and the user ("client") interface side. On the target system side, security can be enhanced by requiring users to provide passwords with greater entropy, by encrypting stored passwords, or by eliminating the reliance on passwords. However, even with many authentication systems increasing password security, users who reuse passwords are still vulnerable to being hacked through the least secure authentication system for which they reuse passwords and login credentials.

On the user interface side, a user can choose to install and rely on a third party application (e.g. Stanford PWDHash, SuperGenPass, LastPass, etc.) to generate unique passwords for each account. Typically, the user provides the third party application a master password and a web address of a login page, then the third party application generates and manages the specific password for that web address and login page. The third party applications vary in their implementation with a tradeoff between password entropy and the need to store and secure individual higher entropy passwords. Further, an attacker who gains access to the master password may have an opportunity (with varying degrees of difficulty) to gain access to all accounts managed by the third party application for that user.

Applicants therefore recognize a need for improved systems and methods for managing user credentials for authentication systems.

SUMMARY

To address shortcomings of password-based authentication, and to generally provide alternative systems and methods for generating authentication tokens, systems and methods are presented herein that deterministically generate high entropy authentication tokens for authenticating to a remote host supporting token or password based authentication (e.g. web services, internet hosts, and Internet of Things devices). The high entropy authentication tokens can be derived from a high entropy random number secured privately on a user device. The derived authentication tokens can include tokens generated according to a standardized scheme such as a JavaScript Object Notation (JSON) Web Token (JWT), an application programming interface (API) token, and the like. However, the derived authentication tokens need not be generated according to a standardized scheme when not required by a target system (e.g. generating a password for a target system configured to receive a user generated password).

In the context of authenticating using a password on a website, an authentication token can be the users' password for that website. Each website can have a password that is unique, thereby reducing password reuse. When logging into a website, the specific password for that website can be deterministically generated via a one-way computational process that takes the high entropy random number and website-specific information as inputs and provides the specific authentication token as an output. The one-way computational process can further deterministically update the specific password when a user wishes to change the password. Because passwords for each website are generated deterministically, there is no need to store passwords for each website.

The high entropy random number can have entropy on par with a private cryptographic key used for asymmetric encryption, and therefore reach exponentially higher entropy than a user provided password. Because passwords for each website are based on the high entropy random number, each password has exponentially higher entropy than a user provided password, and thereby requires increased computational work to discover when hashed compared to a hashed user provided password.

The high entropy random number can further be secured and kept private on the user device by similar methods for securing a private cryptographic key, and therefore can be secured to inhibit transmission of the high entropy random number to other devices. In some examples, the high entropy random number can be stored in encrypted form on the users device and decrypted by a user provided password. In such an example, were the user provided password hacked (e.g. the user reuses an already hacked password), an attacker would additionally require direct access to the user device to gain access to the users accounts secured by the high entropy random number.

Methods and systems can be applied to facilitate user authentication on networks other than via websites and by using authentication information other than passwords. The teachings presented herein can generally apply to authentication of online computer systems including social interactions conducted over a communication network such as the internet and to authentication for secure communications, over the network, as well as social media services and internet of things (IoT) devices.

DETAILED DESCRIPTION

Figure 1:
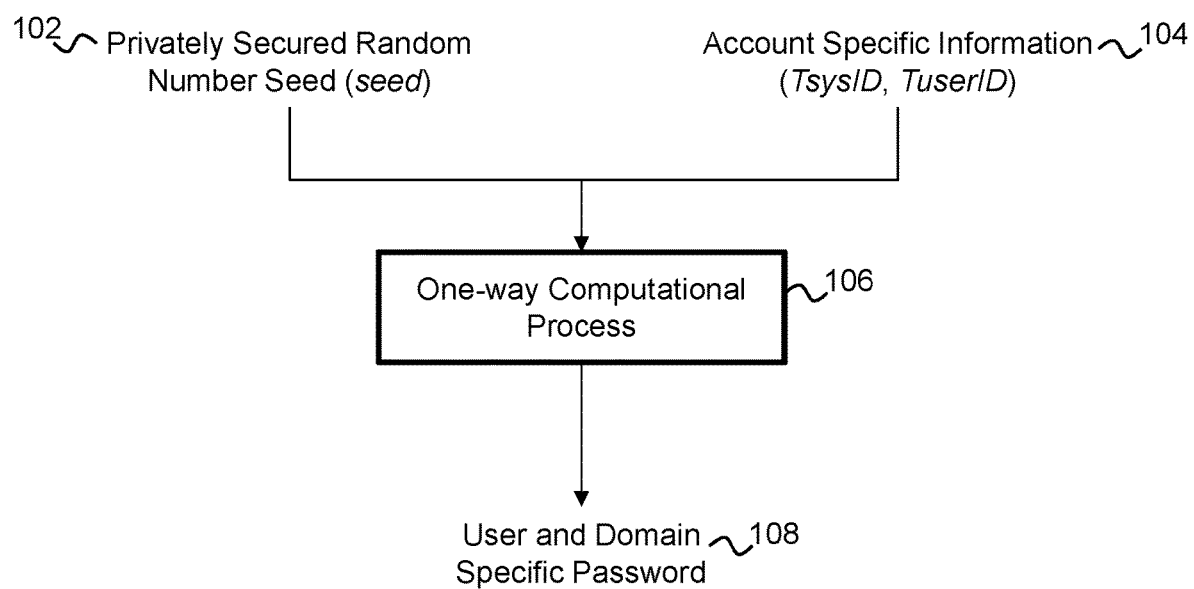
FIG. 1 is a flow diagram illustrating steps for creating a user and domain specific password according to aspects of the present disclosure.

As used herein, the term "authentication token" is intended to include a piece of data usable for authentication with a target system that is itself secured by user authentication. For instance, the token can be secured with a username and password, the user can obtain the authentication token by providing the username and password, and the token can be provided as authentication to the target system. The token itself thereby serves as a password allowing access to the target system.

As used herein, the term "computing system" is intended to include stand-alone machines or devices and/or a combination of machines, components, modules, systems, servers, processors, memory, detectors, user interfaces, computing device interfaces, network interfaces, hardware elements, software elements, firmware elements, and other computer-related units. By way of example, but not limitation, a computing system can include one or more of a general-purpose computer, a special-purpose computer, a processor, a portable electronic device, a portable electronic medical instrument, a stationary or semi-stationary electronic medical instrument, or other electronic data processing apparatus.

The terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

As used herein, the term "database" as referred to herein is intended to include a collection of indexed data stored on a computer readable medium. By way of example and not limitation, data in the database can include numerical values, textual values, images, etc. Data can be hashed, encrypted, or otherwise obscured. Various data can be linked together via association or otherwise indexed. By way of example and not limitation, data in the database can be represented as an indexed matrix. The database can be distributed or centralized.

As used herein, the terms "entropy" and "information entropy" are intended to include entropy in the context of information theory where entropy is a quantification of randomness of a variable, the entropy representing an average level of information, surprise, or uncertainty inherent in the variable's possible outcomes. In the context of a password, entropy is calculated based on how many guesses it would take to more likely than not derive the password through guessing, brute force cracking, dictionary attacks, or other common methods. A password that is already known has zero bits of entropy; a password that can be derived on the first try has 1 bit of entropy; and a password that has n bits of entropy is expected to be guessed within $2^n$ tries or less. Entropy of a truly random number or string expressed in bits is the log base two of the total number of possible combinations of characters and/or numbers in the random number or random string.

As used herein, the term "non-transitory computer-readable media" includes, but is not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable information.

As used herein, the term "nonce" includes a number that is iterated in a non-repeating fashion. A nonce preferably, but not necessarily, includes a random number which varies with time and includes sufficient number of random bits such that repetition of a previously generated nonce value has a probabilistically insignificant chance.

As used herein, the term "one-way computational process" is a computational process that includes a one-way function requiring relatively low computational resources to compute an output provided an input and significantly high computational complexity to compute the input provided the output. The one-way function is a one-way computational process. The one-way computational process can include one or more one-way functions and optionally additional processes which are not one-way. Unless otherwise stated herein, the term "one-way function" is intended to include one-way functions with or without a trapdoor, where a trapdoor value is a secret value which reduces computational complexity to compute the output provided the input. Examples of one-way functions include, but are not limited to, hash functions such as cyclic redundancy checks, checksums, universal hash functions, non-cryptographic hash functions, keyed cryptographic hash functions, and unkeyed cryptographic hash functions. A one-way hash function, also known as a message digest, fingerprint, or compression function, is a mathematical function which takes a variable-length input string and converts it into a fixed-length binary sequence.

As used herein, the terms "private" and "privately" in the context of securing data is intended to include restricting transmission of the secured data such that the data primarily or exclusively exists on devices or systems under user control.

As used herein, the term "random number" is intended to include truly random numbers and/or pseudo random numbers. Such truly random numbers can be generated by sampling a physical process having fundamentally probabilistic behavior such as quantum entropy. Pseudo random numbers can be generated from a source having a bias such as monitoring a computational process.

As used herein, the term "user" includes a person or computer system authenticating to a target system.

As used herein, the term "user's device" is intended to include computing devices and systems usable for a user to authenticate with a target system such as a personal computer, smart phone, tablet, and the like. A user's device can generally include a user interface from which a user can enter personally identifiable information and receive communications from the target system and hardware and software to support the user's interaction with the user interface and target system.

Systems and methods are disclosed herein to generate high entropy deterministic authentication tokens derived from a high entropy random number secured on a user device. In some examples, the system can include memory on a user's device with instructions to execute certain steps in a flow diagram illustrated herein. Optionally, the system can also include memory on a remote server configured to communicate with the user's device, and some portion of steps can be executed by the remote server according to instructions in the server memory. The high entropy deterministic authentication tokens can be generated specifically for a target system upon the user providing a relatively low entropy (compared to the entropy of any of the authentication tokens generated) password or another authentication (e.g. biometric, swipe shape, etc.). The system can provide the user access to all accounts, each secured via a unique respective high entropy authentication token (or password) via the single, lower entropy authentication provided by the password. The single, lower entropy authentication can provide greater convenience to the user by eliminating the need to memorize multiple passwords. The unique high entropy authentication tokens can provide greater security compared to low entropy and/or reused user-provided tokens or passwords.

In the context of a password on a website, the authentication token can be the user's password for that website. Each website can have a password that is unique, thereby reducing password reuse. When logging into a website, the specific password for that website can be deterministically generated via a one-way computational process that takes the high entropy random number and website-specific information as inputs and provides the specific password as an output. Because each specific password is deterministically generated, there is no need to store the specific passwords.

Figure 4:
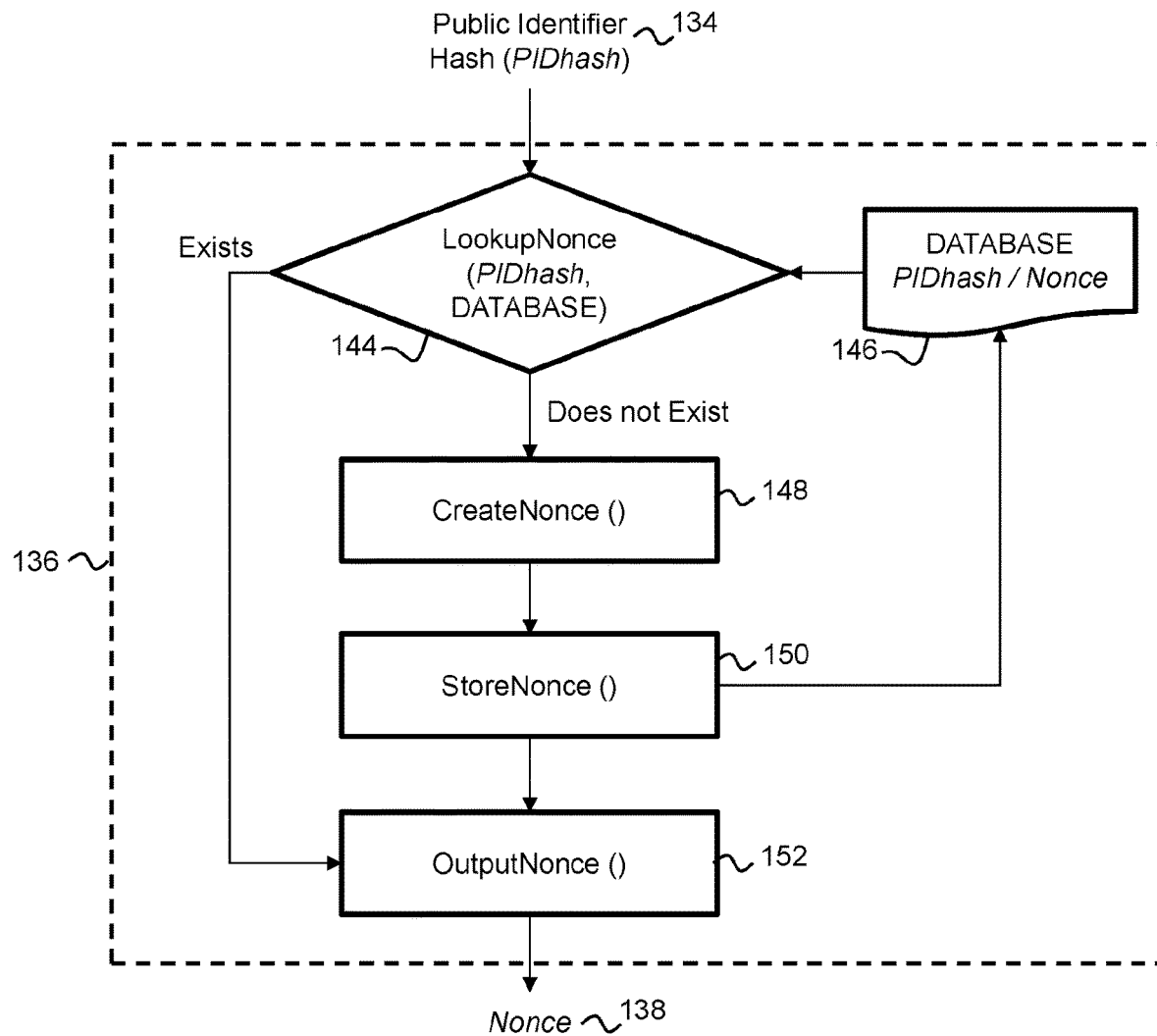
FIG. 4 is a flow diagram illustrating steps for managing authentication token or password updates according to aspects of the present disclosure.
Figure 5:
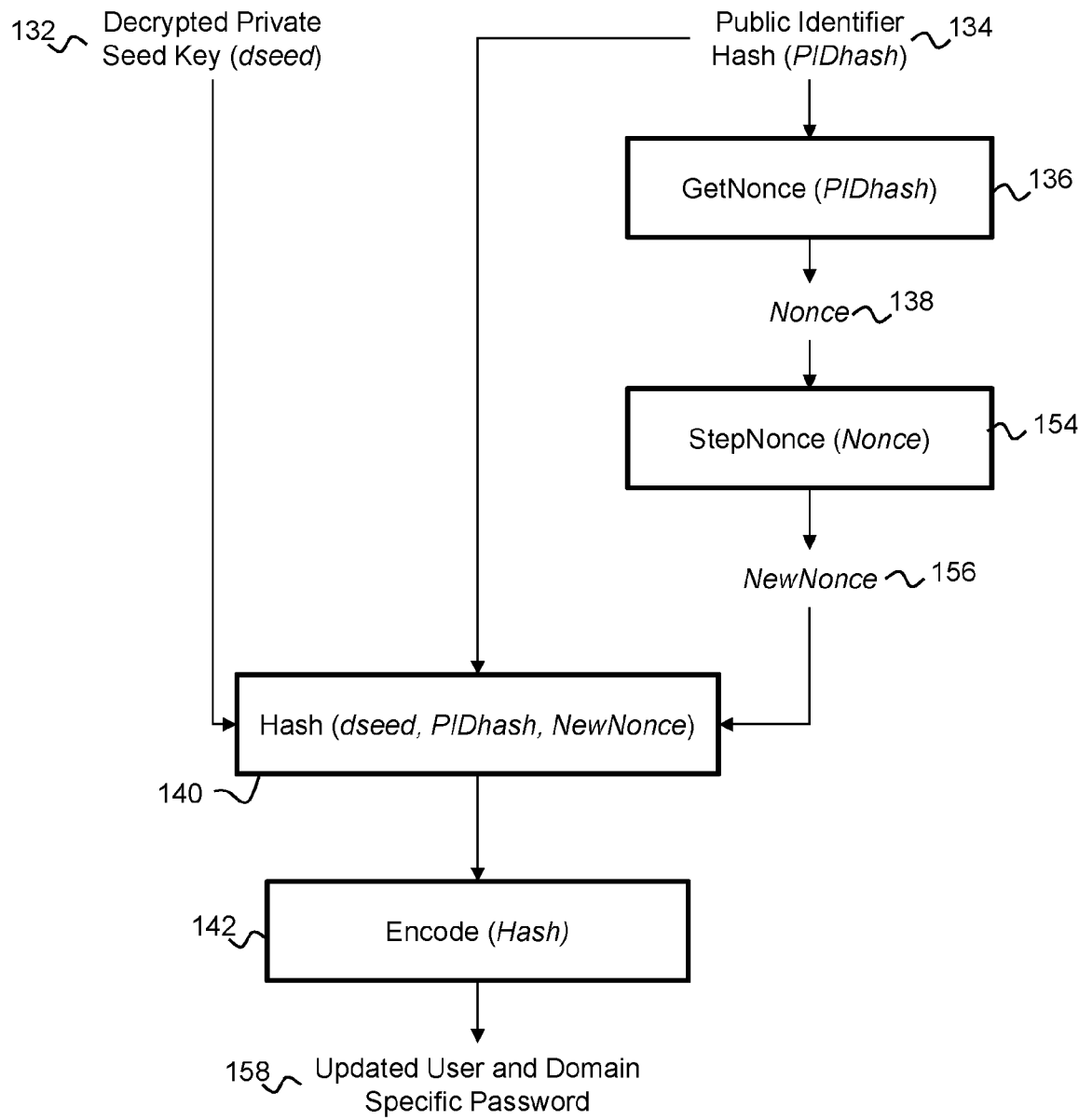
FIG. 5 is a flow diagram illustrating steps for updating an authentication token or password according to aspects of the present disclosure.
Figure 6:
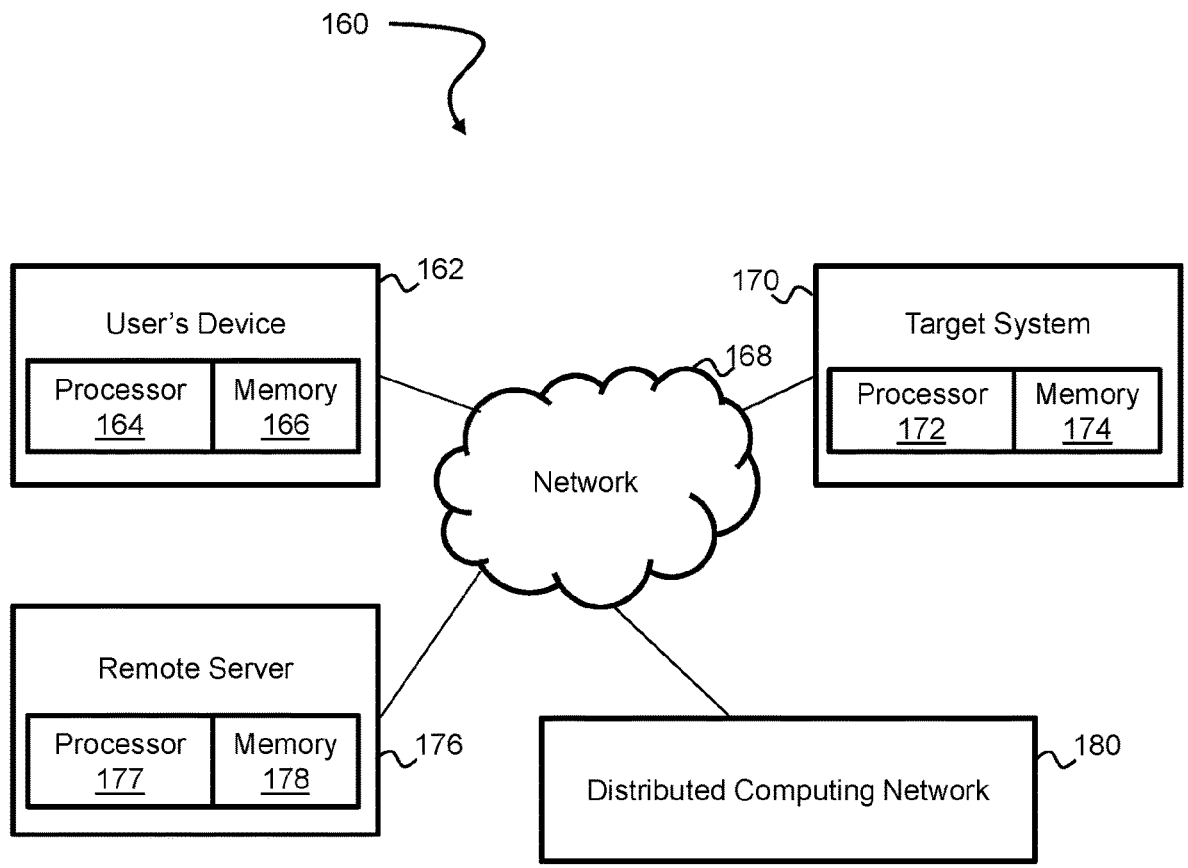
FIG. 6 is an illustration of a system utilizing authentication tokens or passwords according to aspects of the present disclosure.
Figure 7:
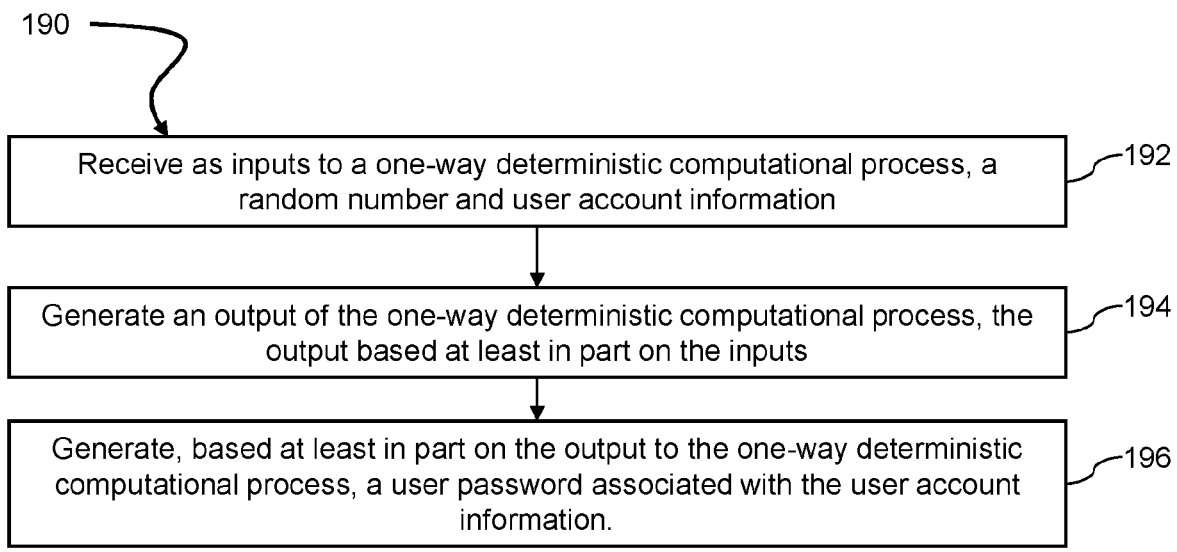
FIG. 7 is a flow diagram illustrating a method for generating deterministic passwords according to aspects of the present disclosure.
Figure 8:
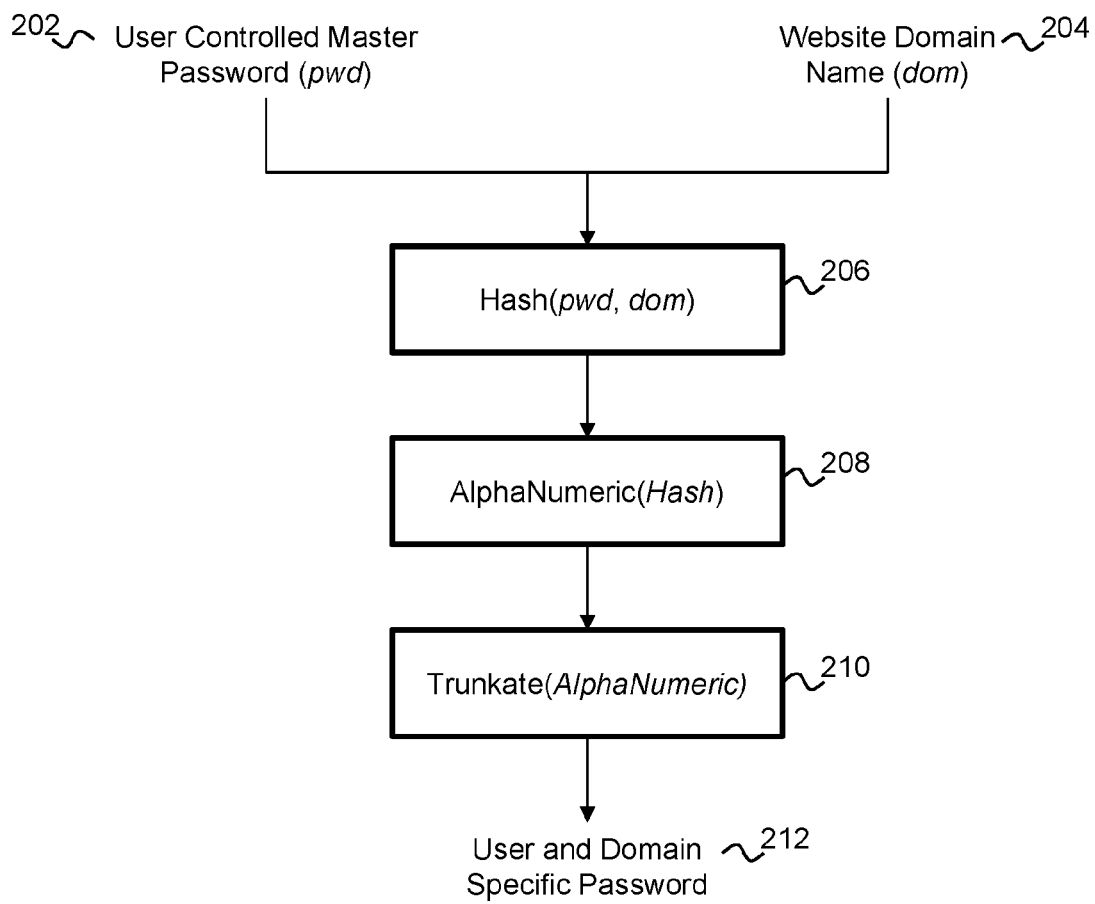
FIG. 8 is a flow diagram illustrating steps for generating deterministic passwords for web-based login as known in the art.

FIGS. 1 through 5 and 7 are flow diagrams illustrating steps that can be executed by the computing system to generate the high entropy deterministic authentication tokens 108, 158. The high level concept of the process is illustrated in FIGS. 1 and 7 with various aspects of the process illustrated in greater detail in FIGS. 2 through 5. FIG. 6 illustrates an example computing system capable of executing steps illustrated in FIGS. 1 through 5. FIG. 8 illustrates steps for generating a password for authentication on a web-based system as known in the art highlight certain advantages and distinctions of the methods and systems of the present invention.

FIG. 1 is a flow diagram illustrating steps for creating a user and domain specific password 108 for authentication at a target system. As appreciated and understood by a person of ordinary skill in the art according to the teachings herein, the password 108 can generically be abstracted to any authentication token. A privately secured random number 102 and account specific information 104 are supplied to a one-way computational process 106. The one-way computational process 106 generates a user and domain specific password 108 based on the privately secured random number 102 and the account specific information 104.

The privately secured random number 102 is referred to herein for convenience as a "seed". The seed 102 is generated preferably from a high entropy random source. The seed 102 preferably contains at least 128 bits of entropy, or more preferably, between 256 and 512 bits of entropy. The seed 102 can be privately secured by the user and need not be transmitted from the user's device.

For securing user passwords, target systems typically rely on storage of passwords in hashed form. Hashing performs a one-way transformation on a password, turning the password into another string called the hashed password. When a user logs into the target system, their password is hashed and compared to the hashed passwords stored by the target system. "One-way" implies that it is computationally difficult to obtain the password from the hashed password. Many hashed passwords are stored by target systems unencrypted such that the target system relies primarily on the computational complexity of recovering a password from a hashed password to protect the user's password. As discussed above, computational complexity of deriving a password from a hashed password increases exponentially with increased entropy. The seed 102 can therefore provide sufficient entropy to the user and domain specific password 108 to render guessing of the password from a hashed form of the password impractically improbable (e.g. expected computational time to guess lasting years, decades, or longer).

The account specific information 104 can include information specific to the target system (TsysID) such as an internet address, unified resource locator (URL), telephone number, name, etc. The account specific information 104 can further include information specific to the user's account such as username, account number, e-mail address, or another user identifier (TuserID). The account specific information 104 is preferably readily available when the user is registering with and providing authentication credentials (e.g. password) to the target system. The account specific information 104, being unique for each account at each target system with which the user has an account, can cause the user domain specific password 108 to be unique for each account and each target system. Therefore, if a password on one of the user's accounts is hacked, the remaining accounts are not vulnerable due to password reuse.

In some examples, the user device can be configured to interact with the target system to retrieve some or all of the account specific information 104. For instance, the user device can be configured to detect input of username and password fields from a target system. The user device can interact via a web browser extension, operating system agent integration, command line tool and/or other such means as understood by a person of ordinary skill in the art according to the teachings herein.

Additionally, or alternatively, the user device can be configured to allow the user to input some or all of the account specific information 104.

The one-way computational process 106 performed on the seed 102 and account specific information 104 can include one or more hashes or other such one-way functions such that derivation of the seed 102 is computationally difficult. The seed 102 can have sufficient entropy to render guessing of the seed 102 given one or more user domain specific passwords 108 impractically improbable (e.g. expected computational time to guess lasting years, decades, or longer).

The one-way computational process 106 can further deterministically update the specific password 108 when a user wishes to change the password. Because passwords for each website are generated deterministically, there is no need to store passwords for each account.

Once the user and domain specific password 108 is generated, it can be transmitted to the target system given a number of methods including, but not limited to: filling in the username and password form in a web browser, copying the generated token to the system clipboard, and/or transmitting the generated token or password via other system means as understood by a person of ordinary skill in the art according to the teachings herein.

Figure 2:
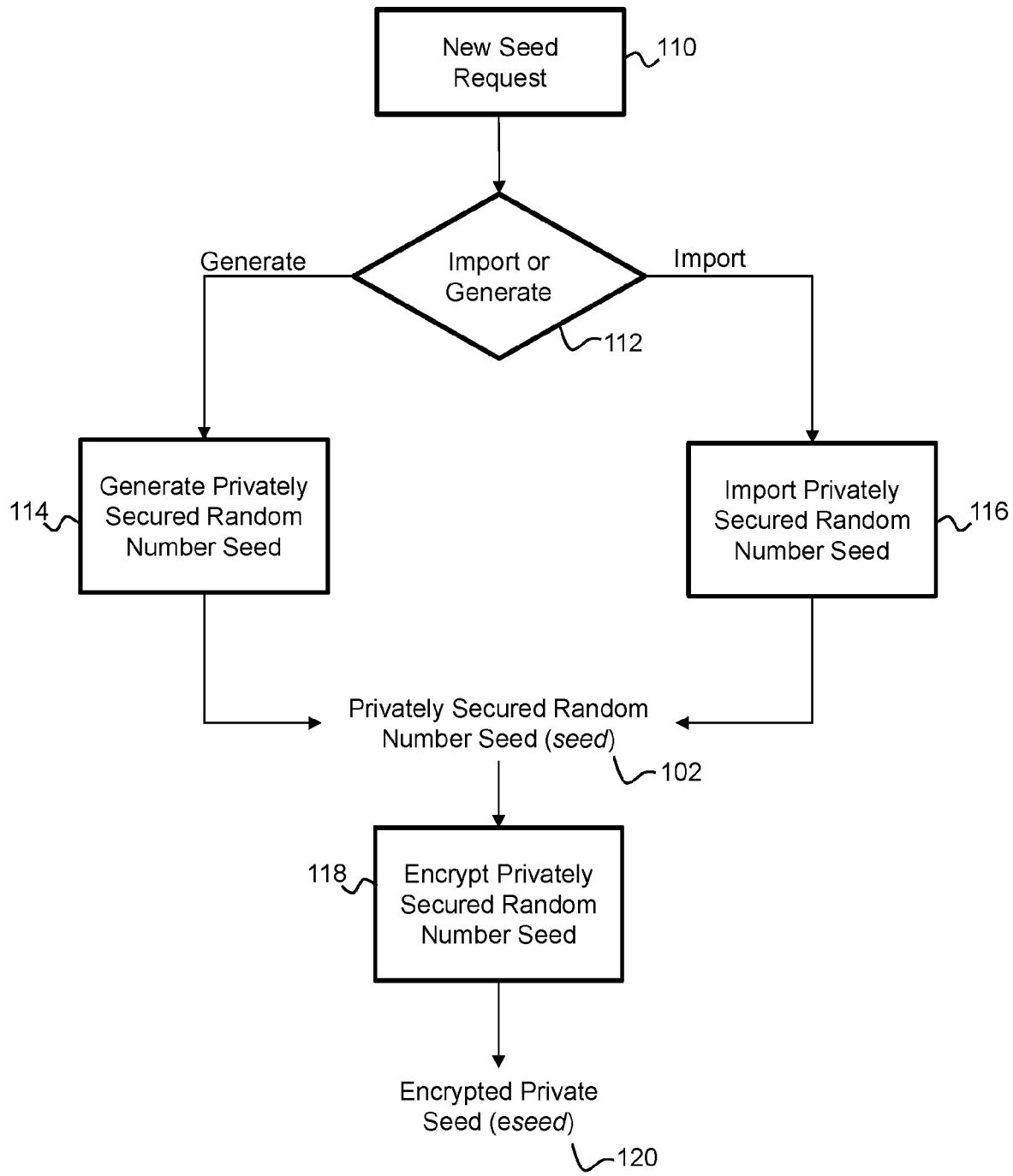
FIG. 2 is a flow diagram illustrating steps for initializing and securing a privately secured random number seed according to aspects of the present disclosure.

FIG. 2 is a flow diagram illustrating steps for initializing and securing the privately secured random number 102. The user can create or import the seed 102. The seed 102 can be created or imported by similar methods as private keys used for encryption are created or imported. In some examples, the seed can be obtained through photographic acquisition of a seed via QR code, input of mnemonic sentences representing the seed (e.g. bip39), input of an encrypted seed from a file, and/or import of seed from other hardware or software wallet device. A user wishing to log onto a target system from multiple user devices can harmonize the seed 102 across the multiple user devices through any of these means or other means similar to harmonizing a cryptographic key.

At step 110 a new seed request can be initiated at a user's device. At step 112, the user can choose to import or generate the seed 102. If generating the seed 102, the process proceeds to step 114 where the seed 102 is generated. If importing the seed 102, the process proceeds to step 116 where the seed 102 is imported (e.g. from one of the user's devices to another). In step 118, the seed 102 is encrypted and stored as an encrypted seed (eseed) 120 on the user's device initiating the new seed request 110. The high entropy random number can be secured and kept private on the user device by similar methods for securing a private cryptographic key, and therefore can be secured to inhibit transmission of the high entropy random number to other devices.

The encrypted private seed (eseed) 120 can be decrypted and provided as the seed 102 input to the one-way computational process 106 illustrated in FIG. 1.

Figure 3:
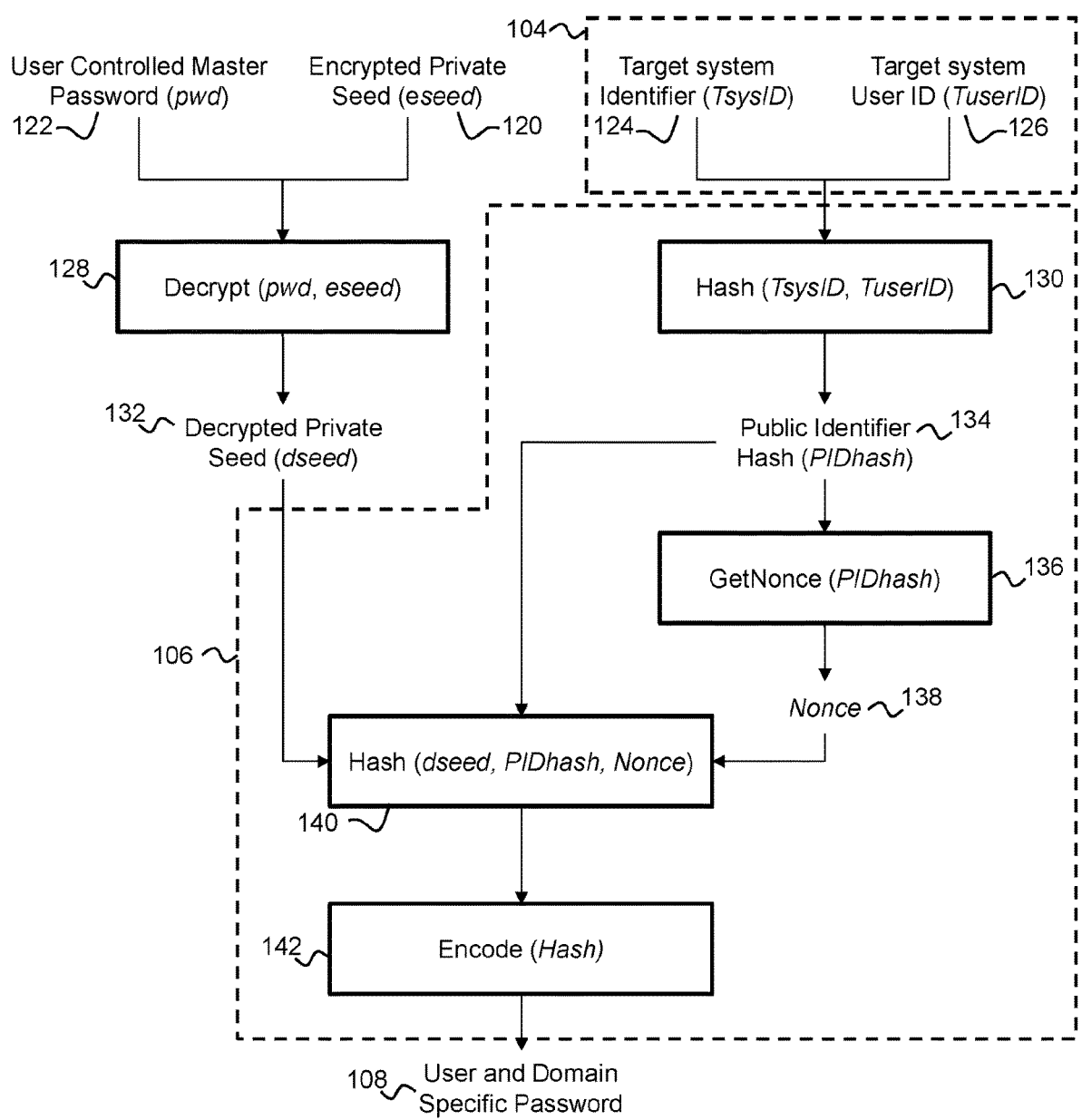
FIG. 3 is a flow diagram illustrating steps for login and/or registration on a target system according to aspects of the present disclosure.

FIG. 3 is a flow diagram illustrating steps for login and/or registration on a target system. In some examples, the high entropy random number can be stored in encrypted form (eseed) 120 on the user's device and decrypted using a user provided password (pwd) 122. In such an example, were the user provided password (pwd) 122 hacked (e.g. the user reuses an already hacked password), an attacker would additionally require direct access to the user device to gain access to the user's accounts secured by the high entropy random number.

At step 128, a decryption function can receive the user controlled master password (pwd) 122 and encrypted private seed (eseed) 120 as inputs and generate a decrypted private seed (dseed) 132 as an output. The decrypted private seed (dseed) 132 can be identical to the seed 102 illustrated and described in relation to FIGS. 1 and 2. The master password (pwd) 122 can be set by the user of the system. The user can decrypt or unlock eseed 120 through various means including input of a previously set master password, input of authorization acquired via biometric measures (e.g. facial recognition, iris scan, thumbprint, etc.), input of a master password from an external electronic device (e.g. Yubi-key or hardware wallet), alternatives thereto, and/or variations thereof as appreciated and understood by a person of ordinary skill in the art according to the teachings of the present disclosure. Credentials authorizing the master password can be stored only on the user's device and need not be transmitted to decrypt the encrypted private seed 120.

At step 130, a hash function can receive account specific information 104 including target system identification (TsysID) 124 and target system user identification (TuserID) 126 and generate a public identifier hash (PIDhash) 134 as an output. PIDhash can be created via a high entropy collision safe hash algorithm such as SHA-3, an alternative thereto, or a variation thereof as understood by a person of ordinary skill in the art according to the teachings herein.

At step 136, a nonce retrieval function can receive PIDhash 134 as an input and provide a nonce (Nonce) 138 as an output. The nonce retrieval function of step 136 can include sub-steps as illustrated in FIG. 4. Nonce 138 can facilitate generation of multiple unique passwords for the same provided account specific information 104; for instance, when a user wishes or is required to update the specific password for a given account. Nonce 138 is preferably a small non-negative integer. Nonce 138 can be used as a counter for each derived authentication token or password for the associated user account. FIG. 5 illustrates steps for updating the specific password using Nonce 138.

At step 140, a hash function can receive dseed 132, PIDhash 134, and Nonce 138 as inputs and generate a hash result (Hash). Because of the high entropy of dseed, the output of step 140 (Hash) can be computationally difficult to guess if Hash becomes known. PIDhash 134 facilitates a unique output for each user account. Nonce 138 facilitates a unique output for each time the password is changed on a given user account. The hash function can include a high entropy collision safe hash algorithm such as SHA-3, an alternative thereto, or a variation thereof as understood by a person of ordinary skill in the art according to the teachings herein. At step 140 a one-way function (alternative to the hash function) can be performed in place of, or in addition to the hash function.

At step 142, an encoding function can receive the hash result (Hash) as an input and generate the user and domain specific password 108 as an output. The password 108 can generically be abstracted to any authentication token. The encoding function can convert the hash result (Hash) from binary data into printable characters by encoding the binary data into printable characters using an encoding including, but not limited to: base64 encoding, base56 encoding, Unicode encoding, a user-defined encoding scheme, variations thereof, alternatives thereto, and/or combinations thereof as understood by a person of ordinary skill in the art according to the teachings herein. For authentication tokens not requiring printable characters, the encoding function can convert the has result (Hash) from binary data into a token 108 having a format as required by the target system.

In some examples, the one-way computational process 106 illustrated in FIG. 1 can include steps 130, 136, 140, and 142.

FIG. 4 is a flow diagram illustrating steps for managing authentication token or password updates. At step 144, a lookup function receives PIDhash 134 as an input and reaches out to a database (DATABASE) 146 to determine whether PIDhash 134 is present in DATABASE 146, and if so, whether PIDhash 134 is associated with a nonce.

If PIDhash 134 exists in DATABASE 146 and is associated with a nonce, the process proceeds to step 152 which outputs the associated nonce as Nonce 138 illustrated in FIG. 3.

If PIDhash 134 does not exist in DATABASE 146 or if PIDhash134 lacks an associated nonce, the process proceeds to step 148 to create a nonce. At step 150, the created nonce is stored to DATABASE 146 and associated with PIDhash 134 within DATABASE 146. The process then proceeds to step 152 which outputs the created nonce as Nonce 138 illustrated in FIG. 3.

DATABASE 146 is preferably a distributed database and PIDhash 134 is preferably a key for Nonce 138. Alternatively, DATABASE 146 can be stored solely on one or more user devices; however, in such an example, a user wishing to log in from multiple user devices may need to synchronize DATABASE 146 across each device when a password (authentication token) 108 is added or updated. Because entropy of each password 108 is determined largely by the entropy of seed 102, PIDhash 134 and Nonce 138 can be publicly available without critically compromising the security of the managed passwords 108.

FIG. 5 is a flow diagram illustrating steps for updating an authentication token or password. The subkey is generated via a high entropy key derivation scheme using a one way function e.g. blake3 in keyed mode where the nonce is used as salt and the system hash is used as input data to the hash function.

PIDhash 134 and dseed 132 can be obtained as illustrated in FIG. 3 and disclosed elsewhere herein. Step 136 can be executed as illustrated in FIGS. 3 and 4 and disclosed elsewhere herein to provide Nonce 138 as an output.

At step 154, a stepping function can receive Nonce 138 as an input and generate a new nonce (NewNonce) 156 as an output. At step 154, NewNonce 156 can be written to DATABASE 146 illustrated in FIG. 4 and associated with PIDhash 134 within the database.

The process can proceed to step 140 providing dseed 132, PIDhash 134, and NewNonce 156 to the hash function illustrated in FIG. 3 at step 140. Next, the process can proceed to step 142 as illustrated in FIG. 3 resulting in an updated user and domain specific password 158. The password 158 can generically be abstracted to any authentication token An example system can be configured to automatically update the user's authentication credentials on managed remote systems. This can be achieved by: generating the current correct password or token 108 for a user account on a target system, automatically logging on to the target system (e.g. via helpers, browser integration, etc.), generating a new authentication token or password 158 for the system by increasing the nonce 138, updating the new password 158 of the remote system (e.g. via browser plugin or other system integration), writing the updated nonce 156 to the database 146, and associating the updated nonce 156 with the hash 134 of the account specific information 104.

FIG. 6 is an illustration of components of an example system 160 which can perform some or all of the steps illustrated in FIGS. 1 through 5 and related description. The system 160 can include at least one user's device 162 having a processor 164 and memory 166 in communication with the processor 164. The memory 166 can include instructions to perform the one-way computational process 106 illustrated in FIG. 1, steps 110, 112, 114, 116, 118 related to generation and securing seed 102 as illustrated in FIG. 2, steps 128, 130, 136, 140, 142 related to generation of the user and domain specific password 108 (or authentication token) as illustrated in FIG. 3, steps 144, 148, 150, 152 for retrieving Nonce 138 as illustrated in FIG. 4, step 154 for updating Nonce 138 as illustrated in FIG. 5, or a subset thereof.

The system 170 can further include a target system 170 configured to provide a prompt to the user's device 162 to provide the account password 108 and then receive the password 108 or a hash thereof. The target system 170 can include a processor 172 and memory 174. Processes illustrated herein can be carried out without modification to the target system 170. However, certain processes such as management of DATABASE 146, PIDhash 134, and/or Nonce 138 can be performed at the target system 170 if desired.

The system 170 can further include a remote server 176 including a processor 177 and memory 178 in communication with the processor 177. The remote server 176 can perform certain processes such as management of DATABASE 146, PIDhash 134, and/or Nonce 138. The remote server 176 can alternatively, or additionally provide random number material for generation of seed 102.

The system 170 can further include a distributed computing network 180 configured to manage DATABASE 146 illustrated in FIG. 4.

The user's device 162 can communicate with other elements of the system 160 via a network 168 such as the internet.

FIG. 7 is an illustration of an example method 190 for generating a deterministic password. At step 192, the method 190 includes receiving a random number and user account information as inputs to a one-way deterministic computational process. At step 194, the method 190 includes generating an output of the one-way deterministic computational process such the output is based at least in part on the inputs received at step 192. At step 196, the method 190 includes generating a user password associated with the user account information such that the user password is generated based at least in part on the output of the one-way deterministic computational process.

FIG. 8 is an illustration of a typical prior art deterministic password generation scheme for managing user passwords on web-based accounts. At step 206, a hash function is performed using a user controlled master password (pwd) 202 and a website domain name (dom) 204 as inputs. At step 208, the hash result (Hash) from step 206 is converted to a string of alphanumeric characters (AlphaNumeric). At step 210, AlphaNumeric is truncated to form the user and domain specific password 212. While the illustrated scheme reduces the likelihood that a user will reuse the same password, reuse of passwords can occur in some circumstances. Although common hacking tactics such as rainbow tables may not be effective in this situation, resulting passwords 212 may still be vulnerable to brute force attacks. Further, all accounts managed under the master password 202 are potentially compromised if the master password 202 becomes known. Analysis follows.

The resulting password 212 is domain specific by virtue of the unique domain name (dom) 204. If no other differentiator (e.g. unique user identifier) is used, the same password 212 will be reused if the user creates multiple accounts on the same domain (e.g. with different usernames). The resulting password 212 is user specific by virtue of the master password 202 being unique for each user. A user providing a commonly used password may therefore have the same password 212 as another user on the same domain if both are utilizing this password generation scheme.

The user controlled master password 202 is provided by the user and is typically a password created and memorized by the user. The website domain name (dom) 204 is a publicly known identifier of the target system. Therefore, the resulting user and domain specific password 212, although it may "appear" more random, has entropy on par with the controlled master password 202. As discussed above, user provided passwords generally have entropy significantly lower than computer generated key material. Computational complexity to retrieve the password 212 from a hash of the password can potentially be low enough for an attacker to guess the password 212 with a brute force attack.

The master password 202 can become known if the user reuses the master password 202 on a hacked account, or if an attacker derives the master password 202 from one or more hacked passwords 212 generated using the master password 202 (e.g. via a brute force attack, dictionary attack, or rainbow table). Once the master password 202 is known, an attacker can generate test passwords by performing steps 206, 208, and 210 on the master password 202 and known website domains 204. The test passwords can then be tried on each of the website domains 204 to access user accounts managed by the master password 202.

In this scheme it can also be difficult to update individual passwords 212 managed by the master password 202 as each individual password 212 cannot be updated without changing the master password 202 and changing the master password in turn requires passwords to be updated with every other user account managed under the master password 202.

Methods and systems can be applied to facilitate user authentication on networks other than via websites and by using authentication information other than passwords. The teachings presented herein can generally apply to authentication of online computer systems including social interactions conducted over a communication network such as the internet and to authentication for secure communications, over the network, as well as social media services and internet of things (IoT) devices.

For instance, the one-way computational process can utilize methods for generating a hierarchical deterministic child key from a known seed (e.g. bitcoin wallet), where the known seed is analogous to the high entropy random number and the child key is analogous to the updated specific password.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a computing system such as a general-purpose computer, a special-purpose computer, a processor, or other programmable data processing apparatus to produce a machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

What is claimed is:

1. A method for generating authentication tokens, the method comprising:
   receiving, as inputs to a one-way deterministic computational process, a random number and user account information, the random number comprising at least 128 bits of entropy;

generating an output of the one-way deterministic computational process, the output based at least in part on the inputs; and generating, based at least in part on the output to the one-way deterministic computational process, an account specific authentication token associated with the user account information.

2. The method of claim 1, wherein the random number comprises from 128 bits of entropy to 512 bits of entropy.

3. The method of claim 1, wherein the random number is privately secured on a user device associated with the user account information.

4. The method of claim 1, further comprising:
decrypting the random number using a password comprising between 14 bits of entropy and 30 bits of entropy.

5. The method of claim 1, further comprising:
unlocking the random number using at least one of a user created password, biometric data, or a password from a hardware wallet.

6. The method of claim 1, wherein the one-way deterministic computational process comprises:
identifying a counter variable associated with the user account information; and
generating the output of the one-way deterministic computational process based at least in part on hashing of the random number, the user account information, and the counter variable.

7. The method of claim 6, wherein identifying the counter variable associated with the user account information comprises:
generating a hashed user account identifier based at least in part on hashing the user account information; and
obtaining the counter variable associated with the hashed user account identifier.

8. The method of claim 7, wherein obtaining the counter variable associated with the hashed user account identifier comprises querying a distributed database.

9. The method of claim 7, further comprising:
generating an updated counter variable by incrementing the counter variable;
associating the updated counter variable with the user account information;
receiving as inputs to the one-way deterministic computational process, the random number, the user account information, and the counter variable;
generating an updated output of the one-way deterministic computational process; and
generating, based at least in part on the updated output to the one-way deterministic computational process, an updated user password associated with the user account information, the updated user password being non-identical to the user password.

10. The method of claim 6, wherein the counter variable is a nonce.

11. The method of claim 1, wherein the user account information comprises one or more of an internet address, a unified resource locator (URL), a telephone number, and/or a target system name.

12. The method of claim 1, wherein the one-way deterministic computational process executes a cryptographic hash function receiving the user account information and/or the random number as an input.

13. Non-transitory computer readable medium with instructions thereon that when executed by a processor cause the processor to:

receive, as an input, a random number, the random number comprising at least 138 bits of entropy;
receive user account information;
execute a one-way deterministic computational process comprising one or more inputs and an output, the one or more inputs based at least in part on the random number and the user account information; and
generate, based at least in part on the output to the one-way deterministic computational process, an authentication token associated with the user account information.

14. The non-transitory computer readable medium of claim 13, wherein the instructions, when executed by the processor, further cause the processor to:
verify the random number comprises from 138 bits of entropy to 513 bits of entropy.

15. The non-transitory computer readable medium of claim 13, wherein the instructions, when executed by the processor, further cause the processor to:
privately secure the random number on a user device associated with the user account information.

16. The non-transitory computer readable medium of claim 13, wherein the instructions, when executed by the processor, further cause the processor to:
decrypt the random number using a password comprising between 15 bits of entropy and 30 bits of entropy.

17. The non-transitory computer readable medium of claim 13, wherein the instructions, when executed by the processor, further cause the processor to:
unlock the random number using one of a user created password, biometric data, and/or a password from an external electronic device.

18. The non-transitory computer readable medium of claim 13, wherein the one-way deterministic computational process comprises:
identifying a counter variable associated with the user account information; and
generating the output of the one-way deterministic computational process based at least in part on hashing of the random number, the user account information, and the counter variable.

19. The non-transitory computer readable medium of claim 18, wherein identifying the counter variable associated with the user account information comprises:
generating a hashed user account identifier hashed at least in part on hashing the user account information; and
obtaining the counter variable associated with the hashed user account identifier.

20. The non-transitory computer readable medium of claim 18, wherein obtaining the counter variable associated with the hashed user account information comprises querying a distributed database.

21. The non-transitory computer readable medium of claim 18, wherein the counter variable is a nonce.

22. The non-transitory computer readable medium of claim 18, wherein the instructions, when executed by the processor, further cause the processor to:
generate an updated counter variable by incrementing the counter variable;
associate the updated counter variable with the user account information;
receive, as inputs to the one-way deterministic computational process, the random number, the user account information, and the counter variable;
generate an updated output of the one-way deterministic computational process; and generate, based at least in part on the updated output to the one-way deterministic computational process, an updated authentication token associated with the user account information, the updated authentication token being non-identical to the authentication token.

23. The non-transitory computer readable medium of claim 13, wherein the user account information comprises one or more of an internet address, a unified resource locator (URL), a telephone number, and/or a target system name.

24. The non-transitory computer readable medium of claim 13, wherein the one-way deterministic computational process executes a cryptographic hash function receiving the user account information and/or the random number as an input.

\* \* \* \* \*